Feb. 27, 1934.      G. G. RUCKER      1,948,771
DEVICE TO STRAIN HOT COOKED GREASE AND CONTAIN SAME
Filed March 24, 1931
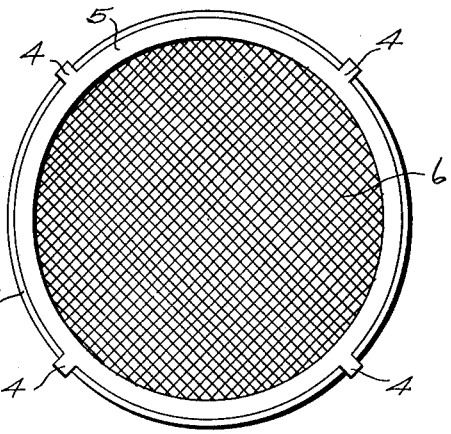
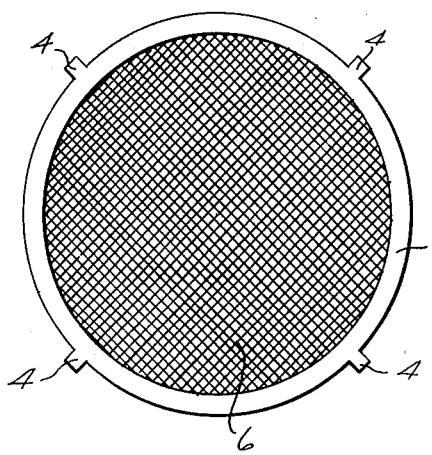
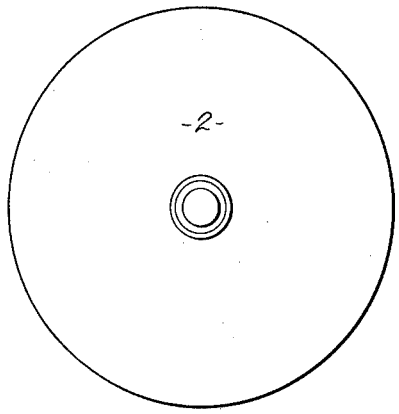
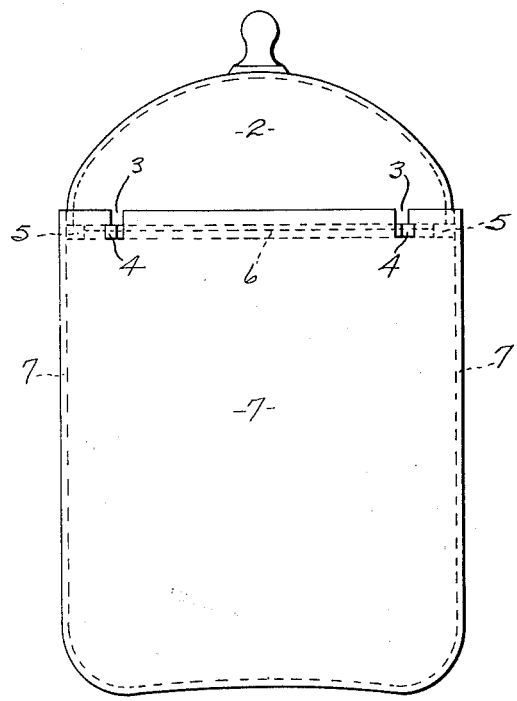
INVENTOR.
Grace Glunt Rucker
BY
U.S. Charles
ATTORNEY.

Patented Feb. 27, 1934

1,948,771

UNITED STATES PATENT OFFICE 1,948,771

DEVICE TO STRAIN HOT, COOKED GREASE AND CONTAIN SAME

Grace Glunt Rucker, Topeka, Kans.

Application March 24, 1931. Serial No. 524,846

1 Claim. (Cl. 210—155)

The invention relates to improvement in device to strain hot, cooked grease, and contain the grease so strained. It consists of three parts: a container, a strainer, and a cover. The container and cover are to be made of metal, enamel ware, or pottery. The strainer consists of a fine metal wire sieve and a metal circular rim to which it is attached. Three or four projections or rests extend from the outer rim of the strainer for the purpose of holding it in place in the top of the container by fitting into corresponding depressions in the top rim of the container. The cover fits on the top of the container in such a manner as to make a tight fitting cover over the container and strainer. The container is somewhat cylindrical in shape, and is to be made in different sizes, varying from a pint to a gallon, according to market demand.

One form of the invention is illustrated in the accompanying drawing, in which Figure 1 is a vertical view of the entire machine assembled; Figure 2, a plan view of the strainer in position in the top of the container; Figure 3 is a plan view of the strainer; Figure 4 a plan view of the lid or cover.

The container is somewhat cylindrical in shape. The top rim of the container wall, 7, contains three or four depressions, 3, into which lugs, 4, on the rim of the strainer, fit. The lid or cover, 2, fits snugly into the top of the container covering the strainer and the open top of the container. The strainer a plan view of which is shown in Figure 3, consists of a fine metal wire screen or sieve, 6, somewhat concave, fastened to a metal rim, 5, on which are three or four projections or rests, 4, which fit into the depressions, 3, in the top rim of the container, thus suspending the strainer in its proper position and on which the lid will seat, as shown in Figure 2.

I am aware that prior to my invention various strainers and containers have been used. I therefore do not claim such a combination broadly; but

I claim:

In a device to strain, in combination, a cylindrical container of considerable length and having a plurality of depressions spaced around the top of the container, a lid insertable within the wall of the container and free to move downward therein, a strainer consisting of woven wire, and an annular rim to which the wire is attached, the rim insertable within the container and having a plurality of outwardly extending lugs to engage in their respective depressions to avoid downward movement of the strainer and to provide a rest for the lid sealed thereon, by which means the strainer and contents of the container are protected as the strainer is required to carry the lid, and the upper extension of the container above the depressions is means to retain the lid in axial alignment with the container interlappingly.

GRACE GLUNT RUCKER.